United States Patent [19]

Weyn

[11] 4,039,687
[45] Aug. 2, 1977

[54] ANIMAL FOOD

[75] Inventor: Hendrik Frans Weyn, Le Chesnay, France

[73] Assignee: Colgate-Palmolive Company, New York, N.Y.

[21] Appl. No.: 665,071

[22] Filed: Mar. 8, 1976

Related U.S. Application Data

[63] Continuation of Ser. No. 502,524, Sept. 3, 1974, abandoned.

[30] Foreign Application Priority Data

Sept. 7, 1973    France .................................. 73.32380

[51] Int. Cl.$^2$ ............................ A23C 9/12; A23L 1/30
[52] U.S. Cl. ................................. 426/62; 426/72; 426/74; 426/534; 426/656; 426/654; 426/658; 426/583; 426/643; 426/250; 426/805
[58] Field of Search ............................ 426/805, 60–62, 426/656, 72, 654, 658, 583, 643, 250, 74, 534; 195/28 R

[56] References Cited

U.S. PATENT DOCUMENTS

| 3,202,514 | 8/1965 | Burgess | 426/805 |
|---|---|---|---|
| 3,642,577 | 2/1972 | Gorring | 195/28 R |
| 3,698,998 | 10/1972 | Avrillon | 426/60 |
| 3,713,976 | 1/1973 | Bunting | 195/28 R |
| 3,830,937 | 8/1974 | Shigeno | 426/2 |
| 3,885,050 | 5/1975 | Ridgeway | 426/60 |
| 3,939,279 | 2/1976 | Kawand | 426/60 |

FOREIGN PATENT DOCUMENTS

| 2,034,080 | 4/1970 | France | 426/7 |
|---|---|---|---|
| 294,390 | 1972 | U.S.S.R. | 426/62 |

OTHER PUBLICATIONS

Microbiology–Pelyan McGraw-Hill, N.Y. 1958 p. 818.
Chemical Eng., Dec. 27, 1971 – Bernnet Animal Feed Protein – Made From N – Paraffin pp. 45–47.

Primary Examiner—Hiram H. Bernstein
Attorney, Agent, or Firm—Kenneth A. Koch; Herbert S. Sylvester; Murray M. Grill

[57] ABSTRACT

An improved animal food wherein synthetic proteins comprise all or a significant part of the protein content of the animal food. The animal food is characterized by a high degree of palatability and high nutritional and caloric value.

2 Claims, No Drawings

ANIMAL FOOD

This is a continuation of application Ser. No. 502,524, filed Sept. 3, 1974, now abandoned.

This invention relates to improved foods for animals and to a novel method for making the same. More particularly, it relates to improved animal foods wherein synthetic proteins comprise all or a significant part of the protein content of the animal food, which animal food is characterized by a high degree of palatability and high nutritional and caloric value.

Animal foods and particularly dog and cat foods are commonly prepared for the consumer in three forms: the meal-type ration which has a dry, more-or-less cereal-like texture, and a moisture content, ranging from about 5% to about 12%, and typically about 10%, which can also be compressed into biscuit form; the intermediate type ration which has a soft texture approaching that of dry cubed or ground cooked meat and a moisture content between 15% and 30%; and the canned-type ration having a more-or-less meat like texture and a high moisture content ranging from about 30% to about 80%, and preferably in the neighborhood of 75%. Due in large measure to the difference in moisture content, these three forms of animal foods have widely divergent product characteristics. Such foods are generally formulated from: (i) meat and/or meat byproducts, or (ii) one or more vegetable protein sources as well as combinations of these together with (iii) other nutritional supplements.

Meal-type animal foods generally have a very high nutritional and caloric value, providing a complete and balanced diet for the animal, and excellent storage characteristics, thus permitting the use of relatively inexpensive packaging techniques. Product stabilization against microbial spoilage is achieved in such a product by maintaining the moisture content below the critical level for vegetative growth of such organisms as yeasts, molds, and bacteria. However, animal acceptance of these foods is generally not high.

The intermediate-type animal foods are also characterized by a high nutritional and caloric value. Their higher level of moisture imparts to the product a softness and desirable texture, producing a semi-solid, particulate and shape-retaining particle which retains its shape throughout packaging and other product handling both prior to and during distribution. Additives are utilized to enable the product to retain its desirable attributes after package opening during a normal anticipated period of re-use, that is, in three weeks or less.

Canned-type animal foods, which generally contain the highest percentage of animal protein of the three types of animal foods are generally received most favorably by animals. As dogs and cats are carnivorous, they naturally prefer the taste and texture of animal proteins to that of the cheaper vegetable proteins. The elevated moisture content of canned-type animal foods necessitates thermal processing in sealed containers to obtain a commercially sterile product. Once such a container is opened, the contents must be quickly consumed, since the product is quite conducive to supporting microbiological growth and hence will deteriorate very rapidly unless stored under refrigeration.

The animal foods presently available contain only natural animal and vegetable proteins in their composition. Animal proteins, which are greatly preferred by dogs and cats for both taste and texture, are far more expensive than the nutritionally nearly equivalent vegetable proteins. As the cost of animal proteins continues to rise, an effective substitute has been osught which will provide a nutritionally complete and palatable substitute at a greatly reduced cost.

The growing or culturing of microorganisms using a hydrocarbon as the sole source of carbon is known. Many of the microorganisms grown on hydrocarbons are able to synthesize useful products such as proteins, amino acids, vitamins, lipids, and other components of value. These products may be found in the cells of the microorganism itself, or the products may be secreted by the microorganism into the medium in which the microorganism is growing. In either case the valuable products are readily recoverable.

The hydrocarbon feeds used for growing such microorganisms are cheap, and excellent high protein products (e.g., up to 70-75% protein) can be recovered therefrom.

It has now been discovered that the proteins synthesized by microorganisms cultured on hydrocarbons, and herein designated "synthetic proteins", can be used in animal foods for both dogs and cats which have high animal acceptance. These synthetic proteins have been found to be unexpectedly similar to natural animal proteins in both taste and texture when incorporated into animal food formulations. For this reason, animal foods based wholly or partly on these synthetic proteins are extremely palatable to both dogs and cats, and such animal foods can be manufactured much more cheaply than animal foods based on natural proteins, whether of animal or of vegetable origin.

The improved animal foods formulated with synthetic proteins according to the present invention may be any one of the three traditional types of animal foods. Thus, a meal-type ration or a dry hard biscuit may be based wholly or partly on synthetic proteins. Such rations or biscuits have a much higher degree of animal acceptance than such foods based on natural proteins, as the animal foods based on synthetic proteins have a taste and texture much closer to that of meat than do the dry animal foods based on natural proteins. Intermediate-moisture and canned-type animal foods can also be successfully based wholly or partly on synthetic proteins, resulting in a food product palatable to animals. The cost of preparing these foods using synthetic proteins is drastically reduced from the cost of preparing these foods using natural proteins, and the animal acceptance of the products is increased. Since the synthetic proteins are very concentrated sources of protein, they may be used in smaller amounts than the natural proteins. While the synthetic proteins may be present in animal food formulations in amounts ranging from about 10% to about 70%, a preferred range is from about 10% to about 30%.

Improved animal foods may also be prepared according to the present invention from a mixture of synthetic protein and natural protein. Where the synthetic protein is mixed with a natural protein, the natural protein is preferably derived from meat or fish. Mixing meat with the synthetic proteins in animal food formulations according to the present inventon enhances the meaty taste of the animal food composition thus increasing its palatability to animals. Fish is used in conjunction with synthetic proteins in animal food formulations according to the present invention in order to impart a pronounced fishy flavor and aroma to the animal food. Fish flavoring is particularly desirable in cat food, as most cats prefer a fish flavored food.

Where the synthetic protein is used in conjunction with a natural protein in compositions according to the present invention, the synthetic protein preferably comprises a major part of the protein component of the animal food formulation, i.e., between about 50% to about 75%.

The following specific examples illustrate various embodiments of the present invention. It is to be understood, however, that such examples are presented for purposes of illustration only, and the present invention is in no way to be deemed as limited thereby. All percentages in the specification and claims are by weight unless otherwise indicated.

EXAMPLE I

Cells of *Saccharomyces cerevisiae* yeast and a paraffinic gas oil are dispersed in small particles in a continuous aqueous phase of a mineral medium having the following composition:

|  | Grams/liter |
| --- | --- |
| Monopotassium phosphate | 7 |
| Magnesium sulfate | 0.2 |
| Sodium chloride | 0.1 |
| Ammonium chloride | 2.5 |
| Nonionic surfactant (oleic acid/ ethylene oxide condensation product) | 1 |
| Water | Balance to make 1000 ml. |

The yeast is cultivated with constant stirring by means of a paddle stirrer operating at about 2000 revs./min., to maintain continuous vortex aerations. The temperature is maintained between 25° and 35° C., and the pH is maintained within the range of 3.5 to 4.5 by periodic addition of disodium hydrogen phosphate. The generation time is five hours.

The pH of the emulsion is adjusted to 8, and the emulsion is centrifuged and washed with water at 60° containing 0.25 parts per thousand of a nonionic surfactant (oleic acid/ethylene oxide condensation product). Two such washings and centifugings give yeasts free from hydrocarbons. A final wash with pure water at 60° C. is carried out to eliminate surfactant remaining in the yeast. The yeast is then dried, and is an excellent source of protein.

An animal food in pallet form is prepared using the following mixture of farinaceous grain material and synthetic protein as prepared by the foregoing process as the starting material:

| Component | Percentage by Weight |
| --- | --- |
| Yellow corn meal | 33.00 |
| Synthetic protein | 62.16 |
| Mineral premix | 3.76 |
| Vitamin premix | 1.08 |

The components of the above mixture are metered out in the proportions stated and mixed and blended togwether. The resulting blended mixture has together. moisture content of 12%. A charge of this mixture is screened (No. 8 screen) to remove large lumps and conveyed to a holding bin.

From the holding bin, the mixture is fed into a volumetric feeder from which it is metered into a wet mix conveyor. The mixture traveled through the conveyor at an average temperature of 150° F. in approximately 30 seconds during which time steam and hot water are added to increase the moisture content of the mixture to approximately 29%.

The mixture from the conveyor is fed by gravity into the input hopper of a barreled extruder operating at a temperature of 320° F. and a pressure of 800 p.s.i. During extrusion, the mixture is expanded and then automatically cut into pellets of S shape, three-sixteenths inch thick and measuring one-half inch by one-half inch in overall dimension. The pellets have a moisture content of approximately 24%.

The pellets are transported from the extruder through an air system in which the temperature of the pellets is reduced to approximately 100° F. and the moisture content to 18%. From the air system, the pellets are deposited onto a belt and conveyed into a drying oven operating at a temperature of approximately 245° F. After fifteen minutes in the drying oven, the pellets coming out of the oven have a temperature of approximately 145° F. and a moisture content of approximately 9.6%.

The pellets from the oven are screened to remove fines and were then conducted to a mechanical separator in which the pellets are divided into two streams, the first containing approximately 10% of the pellets.

The first stream of pellets, while hot, is fed into a spray chamber wherein hot liquid beef tallow at a temperature of 140° F. and in the form of a mist is sprayed through nozzles onto the pellets as they fall through the chamber. The pellets from the spray chamber fall directly into a rotating drum heated by means of infrared heating elements to raise the surface temperature of the drum to 300° F. A mixture of corn meal and vegetable dye is metered into the drum and sprinkled onto the pellets as they are conveyed through the drum. The mixture adhered loosely to the fat coating on the surface of the pellets. The amount of the mixture added is about 2% by weight, based on the weight of the pellets. The pellets coming out of the rotating drum have a temperature of 130° F.

The second stream of pellets is fed by gravity directly into an unheated, rotating drum in which a water mist at the rate of about 6%, based on the weight of the pellets, is directed onto the pellets. At the same time, a mixture of sodium carboxy methyl cellulose and iron oxide (ball-milled to obtain a homogeneous dispersion) is metered into the drum and adheres loosely to the moistened surface of the pellets. The amount of the mixture added is about 11% by weight, based on the weight of the pellets. The pellets come out of the drum at a temperature of approximately 110° F. and have a moisture content of 13.2%.

The first and second streams of pellets are then conveyed to a rotating drum and thoroughly mixed together, and the mixture is cooled to a temperature of approximately 100° F.

This product, upon the addition of moderately warm water gives a thickened aqueous mixture palatable to both cats and dogs.

EXAMPLE II

The procedure of Example I is repeated to prepare an animal food in pellet form using the synthetic protein of Example I, except that the following mixture of farinaceous grain material is used with the synthetic protein:

| Component | Percent by Weight |
| --- | --- |
| Oats | 16.13 |
| Milo | 19.03 |

| Component | Percent by Weight |
| --- | --- |
| Synthetic protein | 52.37 |
| Skim milk | 7.63 |
| Mineral premix | 3.76 |
| Vitamin premix | 1.08 |

The resulting product, upon the addition of moderately warm water, yields a thickened aqueous mixture which is palatable to both dogs and cats.

EXAMPLE III

*Micrococcus cerficans* is grown continuously in the following medium:

| | grams/liter |
| --- | --- |
| Slack wax | 20 |
| Phosphoric acid | 5 |
| Potassium chloride | 1 |
| Calcium chloride | 0.5 |
| $MgSO_4 \cdot 7H_2O$ | 0.2 |
| $MnSO_4 \cdot 4H_2O$ | 0.2 |
| $FeSO_4 \cdot 7H_2O$ | 0.2 |
| Sodium chloride | 0.2 |

The above nutrients are dissolved or dispersed in tap water to obtain the desired concentrations. Concentrated $NH_4OH$ is added as needed to maintain a pH of 7.

The temperature of the reaction is maintained at 30° C. and the fermentation is carried out in a 7.5 liter New Brunswick fermenter with an operating capacity of 4 liters. The air flow rate and agitator speed are varied so as to obtain aeration efficiencies of from 3.5 to 7.0 millimols $O_2$/liter minute as measured by the sulfite oxidation method of Cooper and Fernstrom, Ind., & Eng. Chem 36, 405–509 (1944). The residence time in the fermenter is four hours.

The product cells are harvested by means of centrifugation and washed once with water, recentrifuged and washed twice with acetone and filtered.

The recovered synthetic protein is incorporated into a dog food having the following composition:

| | Percent by Weight |
| --- | --- |
| Synthetic protein | 32 |
| Farinaceous charge (in the form of an equi-part mixture of corn germ meal, corn bran, corn meal, and wheat middlings) | 58 |
| Wheat germ | 3 |
| Fish meal | 3 |
| Alfalfa | 0.5 |
| Beet pulp | 1 |
| Salt | 0.5 |
| Fat | 2 |
| Vitamins, minerals, etc., q.s. | |

One hundred parts by weight of the charge mixture are wetted with 10 parts of water and the mixture placed in a Beale tube (a closed paddle mixer to which steam and hot water are added to the mass as cooking and agitating occur). Cooking is continued for 3 minutes, during which time the moisture content of the mixture rises to about 27%. This mass of material is then passed to an Enterprise extruder (a screw-type extruder) from which it is extruded as a small cylinder of about three-sixteenths inch diameter. These cylinders are then cut to provide a length or height of about three-sixteenths inch.

The uniformly sized cylinders are then placed into a vessel having a false bottom through which hot air is passed. The cylinders are contacted with hot air at inlet temperature of about 300° F. for 30 minutes. Under these conditioners, the product temperature is kept at below 190° F. and the moisture content of the cylinders is lowered to not less than about 3%–5% moisture.

In the second stage of drying, the moisture content is lowered to about 1% by use of inlet air temperature at about 300° F. and outlet temperature at about 270° F. After a period of thirty minutes the product is uniformly and darkly brown in color. The cylinders, when broken into small pieces, are found to be uniformly browned throughout the inner portion of the mixture as well as the surface.

The product (while still undergoing pyrolysis) is quenched to below 125° F. by a cold air blast having a temperature of 40° to 50° F. The product is then screened on an 8 mesh U.S. Standard Sieve screen to remove fines, and then moistened to 8% to 10 % moisture by addition of 10 parts of water to 100 parts of product.

Addition of water to the product gives a moist, readily palatable animal food in which the individual cylinders retain their discreteness.

EXAMPLE IV

*Achromobacter Xerosis* is incubated in the following medium:

| | grams/liter |
| --- | --- |
| N-Octane | 639 |
| Tetradecane | 14 |
| Ammonium sulfate | 1.0 |
| Potassium dihydrogen phosphate | 2.0 |
| Sodium monohydrogen phosphate | 3.0 |
| Magnesium sulfate | 0.2 |
| Calcium chloride | 0.01 |
| Ferrous sulfate | 0.005 |
| Manganese sulfate | 0.002 |
| Sodium carbonate | 0.1 |

The above nutrients are dissolved or dispersed in tap water to obtain the desired concentrations. Concentrated $NH_4OH$ was added as needed to maintain a pH of 7.

The temperature of the reaction mixture is maintained at between 20° and 30° C., and the fermentation is carried out in a 7.5 liter New Brunswick fermenter with an operating capacity of 4 liters. The air flow rate and agitator speed are varied so as to obtain aeration efficiencies of from 3.5 to 7.0 millimols $O_2$/liter minute as measured by the sulfite oxidation method of Cooper and Fernstrom, Ind. & Eng. Chem. 36, 405–509 (1944). The residence time in the fermenter is 36 hours.

The cells are harvested by centrifuging and washing with water, then recentrifuging, washing twice with acetone, and drying.

The recovered synthetic protein is incorporated into a fish flavored cat food of the following composition.

| | Lbs. to Produce 100 lbs. at 37% moisture |
| --- | --- |
| Fish | 18.00 |
| *Dextrose | 15.50 |
| *Synthetic protein | 24.50 |
| *Raw corn flour | 6.30 |
| *Ground oats | 6.50 |
| *Sodium caseinate | 6.30 |
| Edible chicken fat | 8.50 |
| Emulsifier (Mono- and di-glyceride) | 0.33 |
| *Carboxymethylcellulose | 1.80 |
| *Solka-Floc (undegraded ground mercerized cellulose) | 1.80 |

-continued

|  | Lbs. to Produce 100 lbs. at 37% moisture |
|---|---|
| Iodized salt | 1.50 |
| Phosphoric acid | 1.50 |
| *Torula yeast | 0.90 |
| *Potassium sorbate | 0.50 |
| *Choline chloride | 0.4405 |
| *Vitamin supplement | 0.0726 |
| *Cobalt sulfate | 0.0165 |
| *Yellow dye | 0.02 |
| *Red dye | 0.01 |
| Water | Balance to make 100 lbs. |

The ingredients not denoted by an asterisk in the above formulation are used to prepare a slurry. The fish is chopped into small pieces which are then added to a mixing cooker along with the chicken fat, emulsifiers, phosphoric acid, and salt, with water. These ingredients are heated to a temperature of 212° F. and maintained at that temperature for an hour to effect pasteurization and produce a liquified slurry fish composition. The slurry is then finely ground and passed through an emulsifier to convert it to a more or less pulpy, pumpable, flowable puree consistency. The finished emulsion is then placed into a steam-jacketed holding kettle operated with continuous agitation and maintained at a temperature of from 160°-170° F.

The hot pureed form of slurry, hereinafter referred to as the emulsion, is then proportionately blended with the remaining dry ingredients of the formulation in a steam-jacketed continuous cooker wherein the slurry remains for a period of approximately eight minutes and wherein it is subjected to an elevated temperature of about 250° F. converting the blend to a hot thermoplastic extrudable mass, which composition was under continuous agitation throughout the cooking. Addition of the ingredients to the emulsion in the continuous cooker effects substantial gelatinization of the starch content thereof, sodium caseinate serving together with the oat flour and corn flour to bind the proteinaceous constituents derived from the fish and the synthetic protein of the emulsion into a desirable, extrudable composition.

The hot extrudate in a substantially pasteurized condition issues from the continuous cooker at a temperature in the neighborhood of about 212° F. with a moisture content of about 40-47 percent incident to which issuance the hot extrudate undergoes flash evaporation of a very minor fraction of the moisture present. The product issuing from the continuous cooker passes a die which may be of any desired shape such as a star or cylinder, the star shape, for instance, measuring one-quarter inch from top to center. The extrudate is ⅛ subdivided to thicknesses varying from Q to ⅜ inch. The extruded pellets are then immediately cooled by passing them over a cooling screen transmitting dry cool air (90 percent RH at 80° F. ) to an ambient temperature of 80° F. at which point the product is in a form ready to be packaged. During this cooling the gelatinized material is caused to set as well as undergo some moisture loss.

The above cat food formulations are extremely nutritious as well as beneficially endowed with a comparatively high level of moisture, product softness, and desirable texture, offering the cat a semi-solid, particulate, and shape-retaining particle which retains its shape throughout packaging and other product handling.

EXAMPLE V

*Candida lipolytica* yeast previously cultivated on a malt sugar medium and adapted to withdraw its carbon from hydrocarbons is cultured on a heavy gas oil feedstock having the following characteristics:

| Density at 15° C./4° C. | 0.866 |
|---|---|
| Distillation, initial point | 204° C. |
| % at 250° C. | 2 |
| % at 270° C. | 6 |
| % at 357° C. | 82 |
| Final point | 370° C. |
| Pour point | +9° C. |
| Content of normal paraffins by weight | 18% |

The mineral nutritive medium to be used is as follows:

| Monopotassium phosphate | 7 grams |
|---|---|
| Magnesium sulfate | 0.2 gm. |
| Sodium chloride | 0.1 gm. |
| Ammonium chloride | 2-5 gms. |
| Tap water (trace elements) | 100 mls. |
| Yeast extract (rich in B vitamins) | 1 ml. |
| Made up to 1000 mls. with distilled water | |

One liter of the mineral nutritive medium is introduced into a fermenter equipped with an aeration system of a type which forms a vortex in the mixture. The pH is maintained at 4.5 throughout the process with monopotassium phosphate.

Air injection is started up at the rate of 50 liters/hour/liter of medium and the tmeperature maintained at 30° C. Distilled water is added periodically to compensate for evaporation losses.

The fermenter is then seeded with 800 mg. of *Candida lipolytica*, and the gas oil is introduced in four stages in quantities in an exponentially increasing series, so as to reach in all 25 mls./liter of medium.

Incubation is stopped after four days, when the cellular density (concentration of cells) remained constant.

To recover the yeasts, 0.25 parts per ml. by weight of ammonium stearyl trimethyl chloride in water is added to the emulsion formed, and the pH is adjusted to 8 by addition of caustic soda. The discontinous centrifuging of the mixture yields:

a. a pasty phase of yeast cells impregnated with hydrocarbons and aqueous medium,
b. a phase of aqueous mineral medium and
c. a wet hydrocarbon phase.

The pasty phase containing the yeast cells is then washed with water containing 0.25 parts per ml. of ammonium stearyl trimethyl chloride and centrifuged. The washing and centrifuging is repeated and finally the yeast is washed with distilled water at 60° C. to eliminate the surfactant left in the yeast, and is once more centrifuged. The synthetic protein thus obtained is dried at 80° C. to 90° C. in a rapid current of air.

A pet food of high moisture content (65-75% moisture) is formulated using the synthetic protein as prepared above:

|  | Percent by Weight |
|---|---|
| Water | 63.0 |
| Synthetic protein | 15.5 |
| Steamed bone meal | 1.0 |
| Lactic acid | 2.0 |
| Phosphoric acid | 1.0 |
| Cracked barley | 13.5 |
| Wheat germ | 3.0 |
| Food supplements and flavoring (vitamins, cod liver oil, iron oxide, onion powder, etc.) | 1.0 |

All of the ingredients except the grain source items (cracked barley and wheat germ) are placed in a steam-jacketed mixer which is run for 15 seconds. The mixer is turned off, but the ingredients are heated until the contents come to a boil. The grain source items are then added and the mixture is agitated for periods of 15 seconds at 3 minute intervals (to prevent scorching) until the temperature reaches 200° F.

The heated product is then tightly packed into a paper container coated with a polyvinylidene chloride film, care being taken that there are no air pockets in the container. The container is then sealed. There is a small empty head space between the product and the container cover. The temperature of the product at the time of sealing is 180° F.

The container is then inverted so that the heated product comes in contact with all of the inner surfaces of the container, and the container and its contents are then allowed to cool to room temperature.

The resulting pet food is highly nutritious, and is appealing to both dogs and cats.

EXAMPLE VI

The synthetic protein of Example I is used to prepare a frozen dog food from the following ingredients.

|  | Percent by Weight |
|---|---|
| Ground fresh meat | 20 |
| Dried cereal | 20 |
| Synthetic protein | 56 |
| Fortifying ingredients (vitamins, minerals, etc.) | 4 |

The fresh meat, including a high proportion of animal organs such as stomach, intestines, hearts, and the like is ground coarsely and mixed with the cereal (corn, wheat germ meal, rice bran, etc.) and the synthetic protein. These ingredients are stirred together until the cereal absorbs the free fluids of the meat.

The mixture is then passed through a rotary grinder by which it is ground and extruded into pellets. The feed issues from the grinder as veriform pellets of about ⅜ inch in diameter which break off in length of from ½ inch to 1¼ inches. The resulting pellets are immediately quick frozen at −20° F., in which condition they may be kept until ready for use.

EXAMPLE VII

An intermediate-type of food is prepared from the following ingredients, including the synthetic protein of Example V:

|  | Percent by weight |
|---|---|
| Water | 24.1 |
| Synthetic protein | 43.9 |
| Sucrose | 22.0 |
| Sorbitol | 2.1 |
| Tallow | 4.2 |
| Sodium chloride | 1.0 |
| Potassium sorbate | 0.3 |
| Propylene glycol | 2.1 |
| Garlic | 0.2 |
| Red dye | 0.01 |

The liquid portion of the formulation consisting of water, sorbitol, tallow, and propylene glycol is brought to a boil. Thereafter, the remainder of the ingredients in dry form are added to the boiling point. This complete mixture is brought to a temperature of 180° F. at which temperature the mixture is held for 7 minutes. The mixture is thereafter cooled to 80° F.

EXAMPLE VIII

An intermediate-type animal food is prepared from the following ingredients:

|  | Percent by Weight |
|---|---|
| Synthetic protein of Example V | 32.1 |
| Beef tallow | 7.0 |
| Steamed bone meal | 1.0 |
| Lactic acid (85%) | 1.4 |
| Whey (27% solids, feed grade) | 31.0 |
| Molasses | 3.0 |
| Wheat germ | 7.85 |
| Rolled oats | 7.0 |
| Dried brewers' grains | 5.0 |
| Supplements and flavoring (lacithin, vitamins, cod liver oil, iron oxide, onion powder, etc.) | 4.65 |

All of the ingredients except the rolled oats are placed in a covered steam-jacketed mixer and brought to a boil with slight agitation. The wheat germ and rolled oats are then added and the batch was heated to 200° F., with sufficient intermittent mixing to prevent scorching, and held at this temperature for 15 minutes.

EXAMPLE IX

An intermediate-type animal food is prepared from the following ingredients:

|  | Percent by Weight |
|---|---|
| Water | 22.0 |
| Synthetic protein of Example I | 38.9 |
| Sucrose | 22.0 |
| Soya hulls | 2.0 |
| Sorbitol | 2.0 |
| Sodium chloride | 1.0 |
| Potassium sorbate | 0.3 |
| Propylene glycol | 2.1 |
| Garlic | 0.2 |
| Red dye | 0.0075 |
| Dried skim milk | 2.5 |
| Mono- and di-glycerides | 1.0 |
| Bone meal | 2.0 |
| Tallow (surface applied) | 4.0 |

The liquid portion of the aforementioned ingredients, i.e., water, sorbitol, propylene, glycol, mono- and di-glycerides, but not the tallow, is heated to a boil and the remaining dry ingredients are added to the boiling liquid. Specifically, these ingredients are heated for 10 minutes in a steam-jacketed mixer. Thereafter, the dry ingredients are added to the boiling liquid and heated to 180° F. for 10 minutes. The mixture is then cooled to 80° F. by discharging the ingredients from the mixer onto a cooling pan, the mixture being allowed to cool by room temperature air. The mixture is then extruded through a meat grinder which produced ¼ inch in length. These pellets are packaged in a polyethylene bag, other such pellets are assembled as patties and packaged in a cellophane wrapper, but could be inserted into a polyethylene-coated paperboard carton, just sufficient to offer protection against any significant water vapor transmission from the product to the surrounding atmosphere.

EXAMPLE X

An intermediate-moisture, fish-flavored cat food is prepared from the following ingredients:

|                              | Parts by Weight |
| --- | --- |
| Synthetic protein of Example V | 58.5 |
| Fish (whole cod and smelt) | 6.0 |
| Dry corn syrup solids (42DE) | 21.4 |
| Dry non-fat milk solids | 2.5 |
| Bone meal | 2.1 |
| Dicalcium phosphate | 1.4 |
| Propylene glycol | 2.0 |
| Sorbitol | 2.0 |
| Tallow | 2.0 |
| Mono- and di-glycerides | 1.0 |
| Sodium chloride | 0.6 |
| Potassium sorbate | 0.3 |
| Garlic | 0.2 |
| Vitamin mix | 0.1 |
| FD & C red dye | Trace |

The fish, tallow, propylene glycol, sorbitol, and mono- and di-glycerides are heated to boiling. The remaining dry ingredients are added and the mixture heated to 180° F. This temperature is maintained for 7 minutes. The product is then allowed to cool to room temperature. The ingredients are then ground through a meat chopper so that there are no large particles. At this point, the material has a doughy consistency; this dough is rolled into a sheet about ¼ inch thick and then cut into large fish-shaped pieces. The pieces have a salmon-like color. The finish product has a moisture content of 25%.

EXAMPLE XI

A canned fish-flavored cat food is prepared from the following ingredients:

|                               | Percent by weight |
| --- | --- |
| Synthetic protein of Example III | 64.0 |
| Cracked barley | 20.0 |
| Fish (whole cod and smelt) | 15.0 |
| Vitamin and mineral mix | 1.0 |

The above ingredients are stirred together and heated to 170° F. until the mixture becomes relatively homogeneous. The mixture is then packaged into cans as in conventional commercial practice and passed to a retorting operation where the product in the cans is raised to about 250° F. where it is retained for a time sufficient to kill the enzymes initially present, in this case, 90 minutes.

EXAMPLE XII

A highly palatable dog food containing natural as well as synthetic protein is prepared from the following ingredients:

|                               | Percent by Weight |
| --- | --- |
| Synthetic protein of Example I | 60 |
| Ground sheep lungs | 35.99 |
| Steamed bone meal | 1.00 |
| Phosphoric acid | 3.00 |
| Iron oxide | 0.01 |

The ground lungs and synthetic protein are introduced into a steel-jacketed kettle. While the kettle contents are kept agitated, the other enumerated ingredients are added to the kettle. The mixture, which had an initial pH of about 3.8, is heated until the temperature was brought to 212° F. while maintaining continuous agitation to prevent scorching. The mixture is held at 212° F. for about 60 minutes. During heating some water was evaporized. Acid reaction with the proteinaceous material brings about a freeing of some water and some fat. Fat is removed from the kettle.

Upon completion of the heating, additional phosphoric acid is added to adjust the pH of the material to 3.2. At this time water is added to adjust the solids content of the product to about 35%.

EXAMPLE XIII

A pet food of high moisture content (65-75% moisture) is formulated from the following ingredients:

|                               | Percent by weight |
| --- | --- |
| Synthetic protein of Example V | 10.0 |
| Water | 70.50 |
| Rice flour | 5.0 |
| Wheat flour | 11.5 |
| Phosphoric acid | 1.0 |
| Lactic acid | 1.0 |
| Food supplement and flavoring (vitamins, cod liver oil, iron oxide, onion powder, etc.) | 1.0 |

All of the ingredients except the grain source items (rice flour and wheat flour) are placed in a steam-jacketed mixer which is run for 15 seconds. The mixer is turned off, but the ingredients are heated until the contents come to a boil. The grain source items are then added and the mixture is agitated for periods of 15 seconds at 3 minute intervals (to prevent scorching) until the temperature reaches 200° F.

The product is immediately packaged and allowed to cool to room temperature.

The resulting pet food is highly nutritious, and is appealing to both dogs and cats.

EXAMPLE XIV

A canned fish-flavored cat food is prepared from the following ingredients:

|                               | Percent by Weight |
| --- | --- |
| Vitamin and mineral mix | 2.0 |
| Fish | 20.0 |
| Synthetic protein of Example II | 68.0 |
| Rice flour | 10.0 |

The above ingredients are stirred together and heated to 170° F. until the mixture becomes relatively homogeneous. The mixture is then packaged into cans as in conventional commerical practice and passed to a retorting operation where the product in the cans is raised to about 250° F. where it is retained for a time sufficient to kill the enzymes initially present, in this case, 90 minutes.

What is claimed is:

1. An animal food containing synthetic protein comprising the following ingredients:

|                               | % by Weight |
| --- | --- |
| Candida lipolytica yeast | 32.1 |
| Beef tallow | 7.0 |
| Steamed bone meal | 1.0 |
| Lactic acid (85%) | 1.4 |
| Whey (27% solids) | 31.0 |
| Molasses | 3.0 |
| Wheat germ | 7.85 |
| Rolled oats | 7.0 |
| Dried brewers'yeast | 5.0 |
| Nutritional supplements and flavoring | 4.65. |

2. An animal food extruded in the shape of pellets comprising the following ingredients:

|  | % by Weight |
| --- | --- |
| Fish | 18.00 |
| Dextrose | 15.50 |
| Achromobacter xerosic | 24.50 |
| Raw corn flour | 6.30 |
| Ground oats | 6.50 |
| Sodium caseinate | 6.30 |
| Edible chicken fat | 8.50 |
| Emulsifier | 0.33 |
| Carboxymethylcellulose | 1.80 |
| Ground cellulose | 1.80 |
| Salt | 1.50 |
| Phosphoric acid | 1.50 |
| Nutritional supplements | 1.92 |
| Dyes | 0.03 |
| Water | to make 100% |

* * * * *